United States Patent
Park (10) Patent No.: US 12,204,391 B2
(45) Date of Patent: Jan. 21, 2025

(54) CONNECTOR AND COMMUNICATION SYSTEM

(71) Applicant: LS ELECTRIC CO., LTD., Anyang-si (KR)

(72) Inventor: Hun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 166 days.

(21) Appl. No.: 17/802,869

(22) PCT Filed: Jan. 22, 2021

(86) PCT No.: PCT/KR2021/000903
§ 371 (c)(1),
(2) Date: Aug. 26, 2022

(87) PCT Pub. No.: WO2021/172766
PCT Pub. Date: Sep. 2, 2021

(65) Prior Publication Data
US 2023/0104911 A1    Apr. 6, 2023

(30) Foreign Application Priority Data
Feb. 28, 2020 (KR) .......... 10-2020-0025496

(51) Int. Cl.
*G06F 1/26* (2006.01)
*G06F 13/40* (2006.01)
*G06F 13/42* (2006.01)

(52) U.S. Cl.
CPC .......... *G06F 1/266* (2013.01); *G06F 13/4068* (2013.01); *G06F 13/4086* (2013.01); *G06F 13/4247* (2013.01)

(58) Field of Classification Search
CPC .. G06F 1/266; G06F 11/0796; G06F 11/3027; G06F 11/3041; G06F 11/3048;
(Continued)

(56) References Cited

U.S. PATENT DOCUMENTS 6,188,271 B1 * 2/2001 Wang ................ G06F 13/4072
327/530
6,320,406 B1 * 11/2001 Morgan ................ H04L 25/08
326/14
(Continued)

FOREIGN PATENT DOCUMENTS

JP         2018142100 A    9/2018
KR    1019950028270 A    10/1995
(Continued)

OTHER PUBLICATIONS

"HAWK 8000 Controller Installation & Commissioning Instructions". 2019. Honeywell Inc. (Year: 2019).*
(Continued)

*Primary Examiner* — Thomas J. Cleary
(74) *Attorney, Agent, or Firm* — K&L Gates LLP (57) ABSTRACT

The present disclosure provides a connector comprising: a line connection part to which a power line for supplying voltage and a signal line through which a communication signal is transmitted are connected; a device connection part which is electrically connected to the power line and the signal line and to which communication devices are connected; and a selection switch unit which, in order to increase the reception sensitivity of the communication signal transmitted to an end communication device positioned at the end among the communication devices, connects the end communication device, which is connected to the device connection part, and a fail-safe voltage circuit disposed inside thereof.

6 Claims, 4 Drawing Sheets

(58) Field of Classification Search
CPC ............ G06F 11/3051; G06F 13/4063; G06F 13/4068; G06F 13/4072; G06F 13/4086; G06F 13/4247; G06F 13/40; G06F 13/42; G06F 13/4022

See application file for complete search history.

(56) References Cited

U.S. PATENT DOCUMENTS

| | | | |
|---|---|---|---|
| 6,525,559 B1* | 2/2003 | Wu | H03K 19/007 326/23 |
| 7,245,154 B1* | 7/2007 | Davidson | H03K 19/00346 326/82 |
| 11,489,524 B2* | 11/2022 | Tomita | G09G 3/20 |
| 2004/0090265 A1* | 5/2004 | Pradhan | H03F 3/68 330/69 |
| 2004/0105517 A1* | 6/2004 | Ebuchi | H04L 25/493 375/360 |
| 2015/0149671 A1* | 5/2015 | Rohr | G06F 13/4072 710/106 |
| 2015/0250039 A1* | 9/2015 | Zulim | G05F 1/10 315/307 |
| 2016/0294389 A1* | 10/2016 | Snider | H03K 19/007 |
| 2021/0314479 A1* | 10/2021 | Bunn | H04B 1/40 |

FOREIGN PATENT DOCUMENTS

| | | |
|---|---|---|
| KR | 100145630 B1 | 5/1998 |
| KR | 100698980 B1 | 7/2007 |
| KR | 20140144277 A | 12/2014 |
| KR | 101527130 B1 | 6/2015 |

OTHER PUBLICATIONS

"MAX3080-MAX3089 Fail-Safe, High-Speed (10Mbps), Slew-Rate-Limited RS-485/RS-422 Transceivers". Revision 3. 2005. Maxim Integrated Products, Inc. (Year: 2005).*

"Fail-Safe, High-Speed (10Mbps), Slew-Rate-Limited RS-485/RS-422 Transceivers". Dec. 15, 2015. Tridium Inc. (Year: 2015).*

"Failsafe in RS-485 data buses". Analog Applications Journal. 2005. Texas Instruments Incorporated. (Year: 2005).*

International Search Report for related International Application No. PCT/KR2021/000903; report dated Sep. 2, 2021; (5 pages).

Written Opinion for related International Application No. PCT/KR2021/000903; report dated Sep. 2, 2021; (4 pages).

Office Action for related Korean Application No. 10-2020-0025496; action dated Jun. 7, 2021; (4 pages).

Notice of Allowance for related Korean Application No. 10-2020-0025496; action dated Dec. 1, 2021; (2 pages).

* cited by examiner

CONNECTOR AND COMMUNICATION SYSTEM

CROSS-REFERENCE TO RELATED APPLICATIONS

This application is the National Stage filing under 35 U.S.C. 371 of International Application No. PCT/KR2021/000903, filed on Jan. 22, 2021, which claims the benefit of earlier filing date and right of priority to Korean Application No. 10-2020-0025496, filed on Feb. 28, 2020, the contents of which are all hereby incorporated by reference herein in their entirety.

FIELD

The present disclosure relates to a connector and a communication system, and more particularly, to a connector and a communication system that facilitate daisy chain communication.

BACKGROUND

A serial communication method has a lower transmission rate than a parallel communication method, but has advantages of a longer communication distance, and easy utilization of an existing communication line (telephone line, etc.), and a low cost. Serial communication methods include RS-232, RS-423, and RS-485.

For reference, an RS-485 communication system can employ 1:1 connection, multi-drop connection (a full-duplex communication method, in which a transmitting end and a receiving end use separate channels), multi-point connection (a half-duplex communication method in which a transmitting end and a receiving end share a channel).

For example, when the RS-485 communication system uses two differential input and output cables (that is, cables capable of allowing both transmission and reception, however, the transmission and reception are not performed at the same time because of a half-duplex communication method), it has strong noise resistance and a long data transmission distance.

Figure 1:
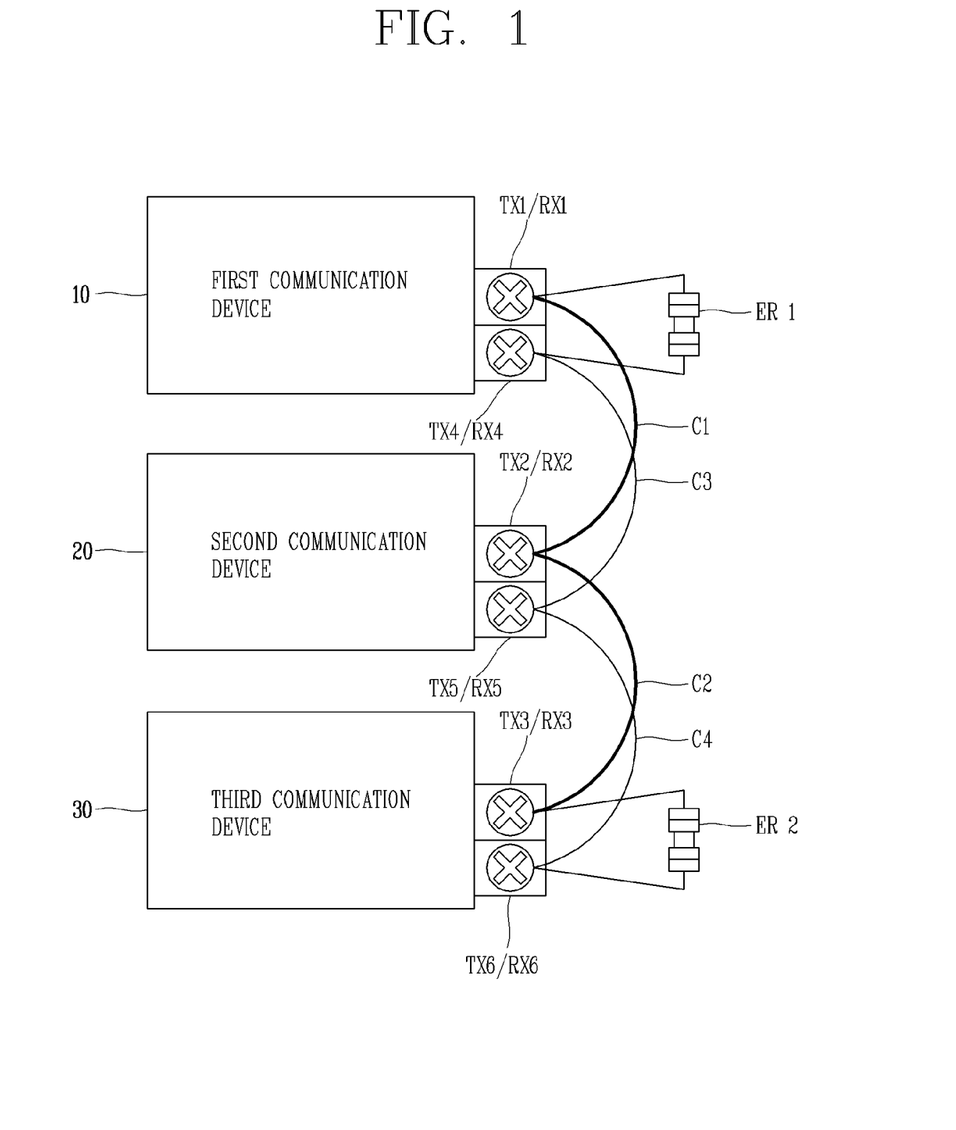
FIG. 1 is a schematic view illustrating a communication system to which a general RS-485 is applied.

FIG. 1 is a schematic view illustrating a communication system to which a general RS-485 is applied.

Referring to FIG. 1, it can be seen that the communication system includes first to third communication devices (or equipment) 10, 20, and 30, and the first to third communication devices 10, 20 and 30 are each connected in a daisy chain manner.

Specifically, a first end resistor ER1 and a second end resistor ER2 are respectively connected to the first communication device 10 and the third communication device 30 located at both terminating ends of the communication system.

A second transmitting end TX2/receiving end RX2 of the second communication device 20 is connected to a first transmitting end TX1/receiving end RX1 of the first communication device 10 through a first cable C1 and a third transmitting end TX3/receiving end RX3 of the third communication device 30 through a second cable C2.

A fifth transmitting end TX5/receiving end RX5 of the second communication device 20 is connected to a fourth transmitting end TX4/receiving end RX4 of the first communication device 10 through a third cable C3 and a sixth transmitting end TX6/receiving end RX6 of the third communication device 30 through a fourth cable C4.

Here, the first and second end resistors ER1 and ER2 may be installed at both terminating ends of the daisy chain type communication system to reduce signal distortion. However, the first and second end resistors ER1 and ER2 must be installed by an expert due to a difficult installation, and have problems such as damage and poor contact due to exposure to the outside.

In addition to the damage and poor contact of the end resistors, a fail-safe voltage circuit should be configured with the end resistors to improve external noise and sensitivity of receivers. This circuit is installed only at the terminating ends and the end resistors and the fail-safe voltage circuit should be connected through separately exposed switches.

In recent years, in implementing the circuit configuration, end resistor installation and exposed switches, work costs increase and researches for facilitating the installation of the end resistors are in progress.

SUMMARY

One aspect of the present disclosure is to provide a connector and a communication system that facilitate communication in a daisy chain manner.

Another aspect of the present disclosure is to provide a connector and a communication system capable of facilitating connection of end resistors and a fail-safe voltage circuit.

The aspects of the present disclosure are not limited to the aspects mentioned above, and other objects and advantages of the present disclosure not mentioned may be understood by the following description, and will be more clearly understood by the embodiments of the present disclosure. It will also be readily apparent that the aspects and advantages of the present disclosure can be implemented by the solutions and combinations thereof disclosed in the claims.

A connector according to the present disclosure may include a line connection part to which a power line for supplying a voltage and a signal line through which a communication signal is transmitted are connected, a device connection part electrically connected to the power line and the signal line, and to which communication devices are connected, and a selection switch part disposed to connect a termination communication device, which is located at a terminating end among the communication devices connected to the device connection part, and an internally disposed fail-safe voltage circuit, to increase reception sensitivity of a communication signal transmitted to the termination communication device.

The line connection part may include a connecting unit to which the power line and the signal line are connected, and a terminal block coupled to the connecting unit, and connected to the fail-safe voltage circuit and the device connection part.

The device connection part may include a connection terminal electrically connected to cables connected to the communication devices, respectively.

The selection switch part may include a first switch to connect the power line and the fail-safe voltage circuit, a second switch to connect a positive transceiver end of the termination communication device and one side of an end resistor included in the fail-safe voltage circuit, and a third switch to connect a negative transceiver end of the termination communication device and another side of the end resistor.

The fail-safe voltage circuit may include an upper fail resistor to which the voltage input to the power line is input, the upper fail resistor connected to the one side of the end resistor, and a lower fail resistor connected to the another side of the end resistor.

The first to third switches may be turned off when the termination communication device does not exist among the communication devices.

The first to third switches may be turned on when the termination communication device exists among the communication devices.

The selection switch part may include at least one of a dip switch and an electronic switch.

A communication system may include a first communication device, a second communication device adjacent to the first communication device and disposed at a terminating end, and a connector to which the first and second communication devices are connected. The connector may include a line connection part to which a power line for supplying a voltage and a signal line through which a communication signal is transmitted are connected, a device connection part electrically connected to the power line and the signal line, and to which the first and second communication devices are connected, and a selection switch part disposed to connect the second communication device, which is connected to the device connection part, and an internally disposed fail-safe voltage circuit, to increase reception sensitivity of a communication signal transmitted to the second communication device.

The device connection part may include first and second connection terminals electrically connected to cables connected to the first and second communication devices, respectively.

The selection switch part may include a first switch to connect the power line and the fail-safe voltage circuit, a second switch to connect a positive transceiver end of the second communication device connected to a positive transmitting end of the first communication device, and one side of an end resistor included in the fail-safe voltage circuit, and a third switch to connect a negative transceiver end of the second communication device connected to the positive transmitting end of the first communication device and another side of the end resistor.

In a connector and a communication system according to the present disclosure, an end resistor and a fail-safe voltage circuit can be easily connected to a communication device disposed at a terminating end, thereby increasing work efficiency.

In the connector and the communication system according to the present disclosure, a plurality of communication devices can be easily connected to each other.

In addition to the above-described effects, detailed effects of the present disclosure will be described together while describing specific details for carrying out the disclosure below.

DETAILED DESCRIPTION

It should be noted that, in the following description, only parts necessary for understanding the embodiments of the present disclosure are described, and descriptions of other parts will be omitted so as not to obscure the gist of the present disclosure.

The terms or words used in this specification and claims described below should not be construed as being limited to their ordinary or dictionary meanings, and should be interpreted as meanings and concepts consistent with the technical idea of the present disclosure based on the principle that the inventors can define appropriate concepts of terms in order to best describe their inventions. Therefore, the embodiments described in the disclosure and configurations illustrated in the drawings are merely illustrative and do not represent all of the technical spirit of the present disclosure, so it should be understood that various equivalents and modifications can substitute for the embodiments at the time of filing the present disclosure.

Hereinafter, embodiments of the present disclosure will be described in more detail with reference to the accompanying drawings.

Figure 2:
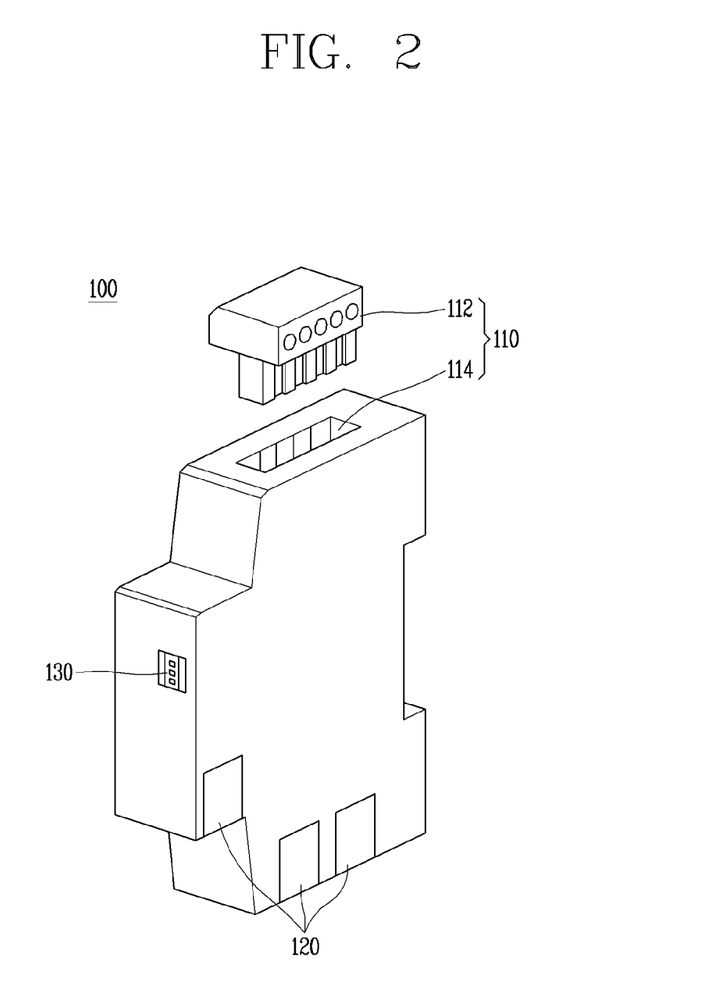
FIG. 2 is a perspective view illustrating a connector in accordance with the present disclosure.

FIG. 2 is a perspective view illustrating a connector in accordance with the present disclosure.

Referring to FIG. 2, a connector 100 may include a line connection part 110, a device connection part 120, and a selection switch part 130.

The line connection part 110 may include a connecting unit 112 and a terminal block 114.

The connecting unit 112 may be connected to a power line (not illustrated), which is connected to an external device for supplying a voltage, and a signal line (not illustrated) for transmitting a communication signal.

Here, the power line and the signal line are led in from the outside, and may be connected to the connecting unit 112 and then connected to a fail-safe voltage circuit, which is disposed inside and implements a circuit pattern, through the terminal block 114 according to an operation of the selection switch part 130.

The connecting unit 112 is a connector type, and may be detachably coupled to the terminal block 114.

The terminal block 114 may be connected with the connecting unit 112 and pins that are electrically connected to the power line and the signal line may be connected to the terminal block 114.

Here, the terminal block 114 may be connected to internal connection patterns.

Communication devices may be plugged in the device connection part 120. The device connection part 120 may be connected to the connection patterns.

That is, cables that are connected to a positive transceiver end and a negative transceiver end of each of the communication devices may be connected to the device connection part 120.

FIG. 2 illustrates an example in which the device connection part 120 has three connection terminals 120 through which cables of three communication devices can be connected, but the number of connection terminals is not limited thereto.

The selection switch part 130 may connect a termination communication device, which is located at a terminating end among the communication devices, and the internally disposed fail-safe voltage circuit, to increase reception sensitivity of a communication signal transmitted to the termination communication device.

In this case, the selection switch part 130 may be turned on when the termination communication device is connected, such that the fail-safe voltage circuit can be connected to a positive transceiver end and a negative transceiver end of the termination communication device.

In addition, the selection switch part 130 may be turned on so that a voltage supplied to the power line can be supplied to the fail-safe voltage circuit in order to increase the reception sensitivity of the communication signal transmitted to the termination communication device.

The selection switch part 130 may be a dip switch or an electronic switch that can be turned on by an administrator or an operator, but is not limited thereto.

When the termination communication device is not connected, the selection switch part 130 may be turned off such that the fail-safe voltage circuit and the communication devices are disconnected from each other.

Figure 3:
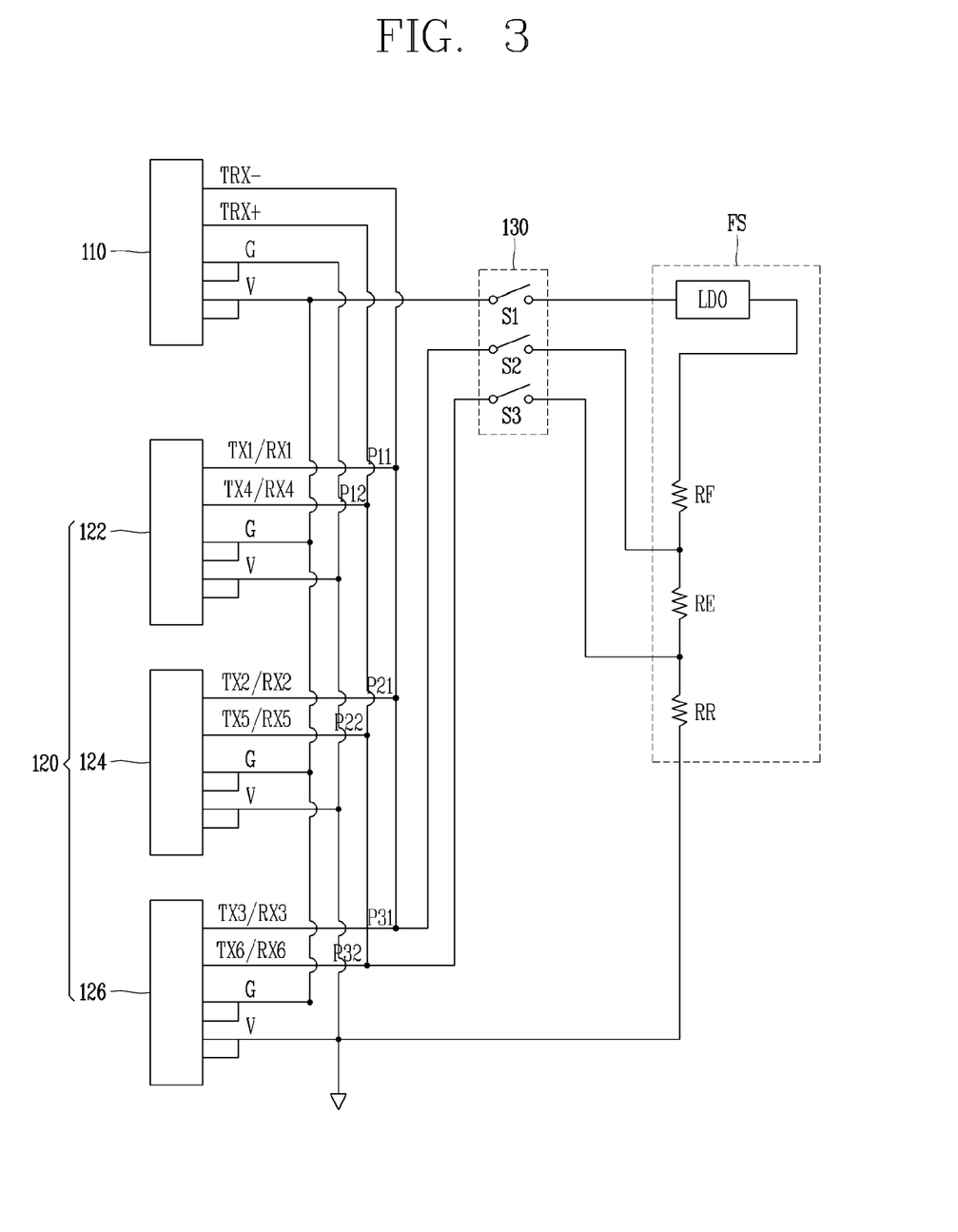
FIG. 3 is a circuit view implemented in the connector illustrated in FIG. 2.

FIG. 3 is a circuit view implemented in the connector illustrated in FIG. 2.

Referring to FIG. 3, the connector 100 may include a line connection part 110, a device connection part 120, and a selection switch part 130.

Here, the line connection part 110 may have a power line and a communication line connected thereto, and may be connected to a power line V, a ground line G, and communication lines TX, RX that are internal connection patterns.

The device connection part 120 may include first to third connection terminals 122, 124, and 126.

Here, the first to third connection terminals 122, 124, and 126 may be connected in parallel to the power line V, the ground line G, and communication lines P1 and P2 that are the internal connection patterns.

In the embodiment, the device connection part 120 is described as including three of the first to third connection terminals 122, 124, and 126, but the number is not limited thereto.

The first to third connection terminals 122, 124, and 126 may be connected to cables of the first to third communication devices, respectively.

Here, communication lines P11 and P12 of the first connection terminal 122 may be connected to a first transmitting end TX1/receiving end RX1 and a fourth transmitting end TX4/receiving end RX4 of the first communication device, respectively. Communication lines P21 and P22 of the second connection terminal 124 may be connected to a second transmitting end TX2/receiving end RX2 and a fifth transmitting end TX5/receiving end RX5 of the second communication device, respectively. Also, communication lines P31 and P32 of the third connection terminal 126 may be connected to a third transmitting end TX3/receiving end RX3 and a sixth transmitting end TX6/receiving end RX6 of the third communication device, respectively.

The communication lines P1 and P2 may be connected in parallel to the communication lines P11 and P12 of the first connection terminal 122, the communication lines P21 and P22 of the second connection terminal 124, and the communication lines P31 and P32 of the third connection terminal 126.

In the embodiment, it will be described that the third communication device connected to the third connection terminal 126 is located at a terminating end.

The selection switch part 130 may include first to third switches S1 to S3.

The first switch S1 may supply a voltage supplied through the power line V to the fail-safe voltage circuit or cut off the voltage supply.

The second switch S2 may allow the communication line P31 of the third connection terminal 126, which is connected to a negative transceiver end of the third communication device located at the terminating end, to be connected to or disconnected from one side of an end resistor RE included in the fail-safe voltage circuit FS.

In addition, the third switch S3 may allow the communication line P32 of the third connection terminal 126, which is connected to a positive transceiver end of the third communication device located at the terminating end, to be connected to or disconnected from another side of the end resistor RE included in the fail-safe voltage circuit FS.

Here, the fail-safe voltage circuit FS may include a voltage regulator LDO to which a voltage is input, an upper fail resistor RF connected to the voltage regulator LDO and the one side of the end resistor RE, and a lower fail resistor RR connected between the another side of the end resistor RF and the ground.

When the third communication device connected to the third connection terminal 126 is located at the terminating end, the first switch S1 may be turned on such that a voltage can be supplied to the voltage regulator LDO of the fail-safe voltage circuit FS, and the second and third switches S2 and S3 may be turned on such that a voltage distributed to the end resistor RE corresponding to a voltage output from the voltage regulator LDO can increase.

Here, the upper fail resistor RF and the lower fail resistor RR may be resistors for resolving an unstable value in the absence of communication.

In this way, in the third communication device located at the terminating end, the first to third switches S1 to S3 can be turned on, such that noise introduction into communication signals transmitted through the communication lines can be prevented and reception sensitivity of the communication signals can be increased by using the end resistor RE of the fail-safe voltage circuit FS and the voltage distributed to the end resistor RE by the fail-safe voltage circuit.

When the third communication device is not located at the terminating end, the first to third switches S1 to S3 may be turned off such that the third communication device cannot be connected to the fail-safe voltage circuit FS.

Figure 4:
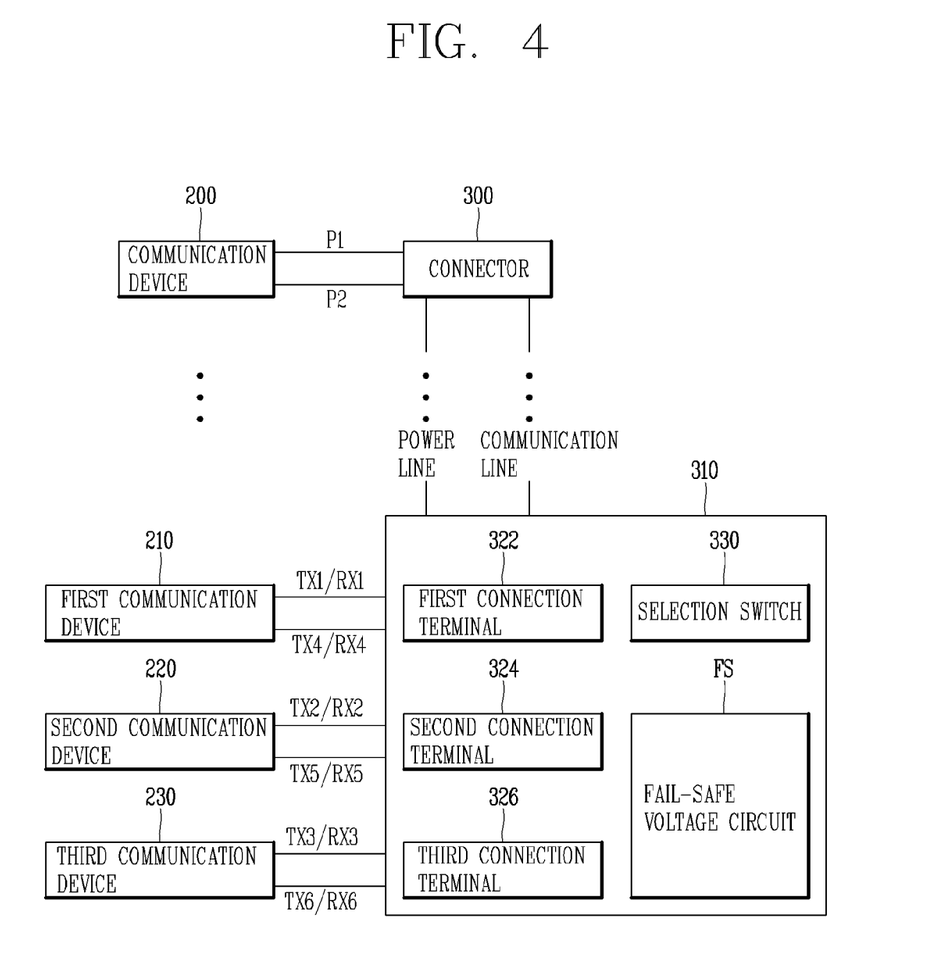
FIG. 4 is a schematic view illustrating a communication system in accordance with the present disclosure.

FIG. 4 is a schematic view illustrating a communication system in accordance with the present disclosure.

Referring to FIG. 4, the communication system may include a plurality of communication devices 200, 210, 220, and 230, a connector 300, and a first connector 310.

Here, the plurality of communication devices 200, 210, 220, and 230 may indicate the communication device 200 and the first to third communication devices 210, 220, and 230.

The communication device 200 may be connected to the connector 300, and the first to third communication devices 210, 220, and 230 may be connected to the first connector 310.

In the embodiment, it will be described that the communication device 200 is located at a middle end and the third communication device 230 among the first to third communication devices 210, 220, and 230 is located at a terminating end.

Here, the connector 300 and the first connector 310 may be configured in the same manner as the connector 100 illustrated in FIGS. 2 and 3.

At this time, a first transmitting end TX1/receiving end RX1 and a fourth transmitting end TX4/receiving end RX4 of the first communication device 210 may be connected to a first connection terminal 322 included in the first connector 310.

A second transmitting end TX2/receiving end RX2 and a fifth transmitting end TX5/receiving end RX5 of the second communication device 220 may be connected to a second connection terminal 324 included in the first connector 310.

Also, a third transmitting end TX3/receiving end RX3 and a sixth transmitting end TX6/receiving end RX6 of the third communication device 230 may be connected to a third connection terminal 326 included in the first connector 310.

At this time, a selection switch 330 may be turned on to electrically connect a fail-safe voltage circuit FS and the third communication device 230 to raise end resistance and fail-safe voltage of the third communication device 230 connected to the third connection terminal 326.

The detailed description of the operation of the first connector 310 will be omitted as described with reference to FIGS. 2 and 3.

As such, a communication device located at a terminating end can be connected to a fail-safe voltage circuit, which includes an end resistor, by turning on a selection switch disposed in a connector, thereby increasing reception sensitivity of a communication signal transmitted to the communication device.

Features, structures, effects, and the like described in those embodiments are included in those embodiments will be included in at least one embodiment, and this is not necessarily limited to only one embodiment. Furthermore, features, structures, effects, and the like illustrated in each embodiment may be combined or modified with respect to other embodiments by those skilled in the art to which the embodiments belong. Therefore, contents related to such combinations and modifications should be construed as being included in the scope of the present disclosure.

In addition, the foregoing description has been made with reference to the embodiment, but it is merely illustrative and is not intended to limit the present disclosure. It will be apparent that other changes and applications can be made by those skilled in the art to which the present disclosure belong without departing from substantial features of the embodiments of the present disclosure. For example, each component specifically shown in the embodiment can be modified and practiced. And it should be construed that differences relating to such changes and applications are included in the scope of the present disclosure defined in the appended claims.

The invention claimed is:

1. A connector comprising:
a line connector configured to connect a power line port with a power line for supplying a voltage and a signal line port with a signal line through which communication signals are transmitted;
a device connector electrically connected to the line connector, and configured to connect two or more devices in a daisy chain arrangement to the power line port and to the signal line port;
a selection switch; and
a fail-safe voltage circuit, including:
  a voltage regulator;
  an upper fail resistor;
  a lower fail resistor;
  an end resistor disposed in series between the upper fail resistor and the lower fail resistor;
  a first switch to selectively connect or disconnect the power line port and the voltage regulator of the fail-safe voltage circuit, wherein the voltage regulator is disposed in series between the first switch and the upper fail resistor;
  a second switch to selectively connect or disconnect a positive transceiver end of a termination device of the two or more devices that is located at a terminating end of the daisy chain arrangement among the two or more devices and between the upper fail resistor and the end resistor included in the fail-safe voltage circuit;
  a third switch to selectively connect or disconnect a negative transceiver end of the termination device and between the lower fail resistor and the end resistor; and
wherein the first switch, the second switch, and the third switch are in an open state until the termination device is connected to the device connector, at which time the first switch, the second switch, and the third switch are in a closed state.

2. The connector of claim 1, wherein the line connector comprises:
a connecting unit to which the power line and the signal line are connected; and
a terminal block coupled to the connecting unit, and connected to the fail-safe voltage circuit and the device connector.

3. The connector of claim 1, wherein the device connector comprises a connection terminal electrically connected to cables configured to be connected to each of the two or more devices.

4. The connector of claim 1, wherein the selection switch comprises at least one of a dip switch and an electronic switch.

5. A communication system using a daisy chain communication method, the system comprising:
a first device;
a second device disposed at a terminating end of a daisy chain that includes the first device and the second device; and
a connector to which the first device and the second device are connected,
wherein the connector comprises:
  a line connector to which a power line for supplying a voltage and a signal line through which a communication signal is transmitted are connected;
  a device connector electrically connected to the power line and the signal line via the line connector, and to which the first device and the second device are connected to transfer the voltage from the power line to the first device and the second device and to transmit and receive the communication signal among the first device and the second device over the signal line according to the daisy chain; and
  a fail-safe voltage circuit, configured to increase reception sensitivity of the communication signal transmitted to the second device, wherein the fail-safe circuit comprises:
    a voltage regulator;
    an upper fail resistor;
    an end resistor, disposed such that the upper fail resistor is in series between the voltage regulator and the end resistor; and
    a lower fail resistor, disposed such that the end resistor is in series between the upper fail resistor and the lower fail resistor; and
  a selection switch disposed to connect the second device, which is connected to the device connector, wherein the selection switch comprises:
  a first switch to selectively connect the power line and the fail-safe voltage circuit;
  a second switch to selectively connect a positive transceiver end of the second device connected to a positive transmitting end of the first device, and a first side of an end resistor included in the fail-safe voltage circuit;

a third switch to connect a negative transceiver end of the second device connected to the positive transmitting end of the first device, and a second side of the end resistor; and wherein the first switch, the second switch, and the third switch are open until the second device is connected to the device connector, at which time the first switch, the second switch, and the third switch are closed.

6. The communication system of claim 5, wherein the device connector comprises first and second connection terminals electrically connected to cables connected to the first device and the second device, respectively.

* * * * *